United States Patent
Bass et al.

[11] Patent Number: 6,144,668
[45] Date of Patent: Nov. 7, 2000

[54] SIMULTANEOUS CUT THROUGH AND STORE-AND-FORWARD FRAME SUPPORT IN A NETWORK DEVICE

[75] Inventors: Brian M. Bass, Apex; Douglas Ray Henderson, Raleigh; Edward Hau-chun Ku, Cary; Scott J. Lemke, Raleigh; Joseph M. Rash, Wake Forest; Loren Blair Reiss; Thomas Eric Ryle, both of Raleigh, all of N.C.

[73] Assignee: International Business Machines Corporation, Armonk, N.Y.

[21] Appl. No.: 08/979,043

[22] Filed: Nov. 26, 1997

[51] Int. Cl.$^7$ .................................................. H04L 12/28
[52] U.S. Cl. ........................................ 370/401; 370/428
[58] Field of Search .................................. 370/401, 402, 370/403, 404, 405, 392, 428

[56] References Cited

U.S. PATENT DOCUMENTS

| | | | |
|---|---|---|---|
| 5,307,345 | 4/1994 | Lozowick et al. | 370/61 |
| 5,490,007 | 2/1996 | Bennett et al. | 359/139 |
| 5,491,687 | 2/1996 | Christensen et al. | 370/253 |
| 5,519,695 | 5/1996 | Purohit et al. | 370/352 |
| 5,521,913 | 5/1996 | Gridley | 370/58.2 |
| 5,598,581 | 1/1997 | Daines et al. | 395/872 |
| 5,757,795 | 5/1998 | Schnell | 370/392 |
| 5,828,475 | 10/1998 | Bennet et al. | 370/352 |
| 5,910,954 | 6/1999 | Bronstein et al. | 370/401 |
| 5,923,654 | 7/1999 | Schnell | 370/390 |
| 5,926,473 | 7/1999 | Gridley | 370/389 |
| 5,982,741 | 11/1999 | Ethier | 370/201 |

FOREIGN PATENT DOCUMENTS

| | | |
|---|---|---|
| 9149067 | 6/1997 | Japan . |
| 9149068 | 6/1997 | Japan . |

OTHER PUBLICATIONS

IBM TDB, Vo. 37, No. 5, May 1994, "ATM Switch with Cut-Through Shared Buffers".

*Primary Examiner*—Chau Nguyen
*Assistant Examiner*—Suibel M. H. Schuppner
*Attorney, Agent, or Firm*—Daniel E. McConnell

[57] ABSTRACT

A method and system are provided for enabling simultaneous cut-through and store-and-forward transmission of frames in high speed network devices. A Buffer Parameter Vector chains multiple frame buffers together. Frame Parameter Vectors created for each unique version of a frame are used to manage frames as they flow through the network device. Cut-through/store-and-forward decision logic determines whether frames can be transmitted by cut-through or store-and-forward. Multiple unique frames or copies of a frame that are to be transmitted store-and-forward have their Frame Parameter Vectors chained together by pointers. The cut-through/store-and-forward decision logic steps through the chain of Frame Parameter Vectors resulting in the frames associated with each Frame Parameter Vector being transmitted.

25 Claims, 11 Drawing Sheets

FIG. 4

| Byte 0 | | Byte 1 | | Offset in BPV Data Structure |
|---|---|---|---|---|
| 15 | 8 | 7 | 0 | |
| Next BPV | | | | x'0' |

FIG. 5

| Byte 0 | | Byte 1 | | Byte 2 | | Byte 3 | | Offset in FPV Data Structure |
|---|---|---|---|---|---|---|---|---|
| 31 | 24 | 23 | 16 | 15 | 8 | 7 | 0 | |
| Next FPV | | | | VLAN Counter Group Index | | | | x'0' |
| First BPV | | | | First Buffer Offset | | Flags/Status | | x'4' |
| Transmit Command | | | | | | | | x'8' |
| Parent Pointer | | | | Child Count | | Reserved | | x'C' |

FIG. 6

| Byte 0 | | Byte 1 | | Byte 2 | | Byte 3 | | Offset in MFPV Data Structure |
|---|---|---|---|---|---|---|---|---|
| 31 | 24 | 23 | 16 | 15 | 8 | 7 | 0 | |
| Next MFPV | | | | Reserved | | Child Count | | x'0' |
| Buffer Count | | Last Buffer End Offset | | In Port | | Flags/Status | | x'4' |
| Second BPV Pointer | | | | Last BPV Pointer | | | | x'8' |
| Store & Forward Queue Head Pointer | | | | Store & Forward Queue Tail Pointer | | | | x'C' | under  # SIMULTANEOUS CUT THROUGH AND STORE-AND-FORWARD FRAME SUPPORT IN A NETWORK DEVICE

CROSS-REFERENCE TO RELATED APPLICATION

The following application of common assignee filed on Nov. 20, 1997 contains some common disclosure with that of the present application:

"Multicast Frame Support in Hardware Routing Assist", Ser. No. 08/975,231 filed Nov. 20, 1997 and owned in common with this invention (RA997090).

This cross-referenced application is hereby incorporated by reference into this application as though fully set forth herein.

BACKGROUND OF THE INVENTION

1. Technical Field

The present invention relates in general to devices having combined routing and switching functions in computer networks, and in particular to such devices in local area network and wide area network environments. Still more particularly, the present invention relates to improving performance of high speed networking devices by enabling simultaneous transmission of frames by both cut-through and store-and-forward techniques.

2. Background Art

Computer networks are classified by their geographic scope. The most commonly used terms for classifying computer networks are local area network (LAN) and wide area network (WAN). LANs are generally limited to computers within a relatively small area, such as a building, office or campus. WANs, on the other hand, connect computers over larger geographic scopes, such as from one city to another.

Various technologies have evolved for communications and/or data transmission in computer networks, including Ethernet, high speed Ethernet, token ring, fiber distributed data interface (FDDI), and asynchronous transfer mode (ATM). Data transmission within and between networks using such technologies are governed by various protocols, such as frame relay, X.25, Integrated Services Digital Network (ISDN), media access control (MAC) address protocol, and transmission convergence protocol/internet protocol (TCP/IP).

As with other forms of digital communications, data in computer networks is commonly transmitted in packets or frames, i.e., discrete bundles of data. Frames are comprised of various fields, such as header, address, data and control fields. The arrangement or format of these fields within a frame is protocol-dependent. An explanation of some frame formats commonly used in computer networks may be found in Internet Engineering Task Force (IETF) Request for Comments (RFC) 1490, which is incorporated herein by reference. However, it will be understood by those skilled in the art that RFC 1490 is not exhaustive of all frame formats currently in use.

A given communications or data transmission process in a network often requires delivery of multiple packets or frames of data from a source to a destination within the network. For example, retrieval of a file using file transfer protocol (FTP) will generally be accomplished using a large number of frames. Although relating to the same process, different frames may be transmitted via different paths within the network. As used herein, a data flow refers to a sequence of related frames sent from a particular source to a particular destination within the network.

Various devices exist for transmitting packets or frames of data within a network or between networks. A bridge or gateway—the terms are often used interchangeably—passes frames of data from one network to another, the two networks typically being local area networks. Bridges store-and-forward frames of data, looking only at the low-level addressing and not at the frame's internal data to determine where the frames are sent. In the store-and-forward mode, each data frame is fully received and stored or buffered in the device. The frame is then checked for errors before being forwarded to the destination output port. If the data frame contains an error, the frame is discarded. The disadvantage of this technique is that it increases the delay from the time a source node transmits the data to the time the data is received by a destination node.

Routers are an evolution beyond bridges, usually routing frames of data at a higher level protocol than is handled by bridges. The oldest routers were internet protocol (IP) routers, but other protocols may be routed including InterPacketExchange (IPX) by Novell, Inc., and high performance routing (HPR) by International Business Machines Corporation. Like bridges, routers store-and-forward frames. However, a router, after storing a frame of data, looks into the internal data of the frame for higher protocol information regarding the ultimate destination of the frame. A router then consults an internal table of available paths to the ultimate destination and corresponding protocols supported by those paths, and makes a decision regarding how to route the frame to its ultimate destination.

A switch is a hardware device providing physical connection within or between different networks. Unlike bridges and routers, a switch typically forwards data without first storing the entire frame. The delays inherent in storing the entire frame before forwarding are thus eliminated. A switch transmits the data bits of the frame received from the source port directly to the destination port as soon as the destination port is ascertained.

To improve high-demand, high-bandwidth data delivery, the network industry is attempting to overcome latency (delay) in routers by going to switching technologies. LAN technologies such as Ethernet, high speed Ethernet, and token ring have been adapted to use switches. ATM, which may operate through switches, works in either LAN or WAN environments. As switching is implemented in LAN environments, LAN connections have moved from shared access transport (SAT) sharing of media to connecting directly to switch ports. The LAN framing remains unchanged, but data flows attempt to pass or "cut-through" the switch. Cut-through avoids completely storing the frame before forwarding it, passing through the bits as soon as the destination port is known. In the cut-through mode, the LAN switch analyzes the address information contained in a frame header, and immediately begins transferring data received from one LAN segment to the destination LAN segment as determined by the address information. Adaptive cut-through is a variation which seeks to avoid wasting frames if the destination port is already busy by storing the frame in the switch until the destination is available. The problem with cut-through mode is that frames containing erroneous data are transferred from one LAN segment to another LAN segment, and upon reception by a node in a destination LAN segment, the data frame is discarded. By transferring a frame containing erroneous data, bandwidth has been wasted in the LAN switch, the destination LAN segment, and the data processing system connected to the destination node.

The need for high performance network devices continues to increase. The current trend in network implementation is to use both routing and switching together at a network node. Products are being developed which combine routers—especially IP routers—with switches. This need for high performance devices is driving network product designers to support more complex functions at the hardware level, including frame processing.

In current designs where data link layer (layer 2 of the Open Systems Interconnection reference model) frame forwarding function (i.e., switching) is provided, cut-through support is a relatively trivial function to perform since typically all ports of such a device run at the same transmission speed. When supporting network layer (layer 3 of the Open Systems Interconnection reference model) frame forwarding function (i.e., routing), cut-through support is no longer trivial since this type of device can support ports having a variety of transmission speeds. In this case, it is not always true that a network device would need to support only cut-through functions or only store-and-forward functions. There are cases when both functions must be supported by the same device simultaneously. In general, a device can support cut-through functions only if the receiving port of the device is at least as fast as the transmitting port. When the transmitting port of the device is faster than the receiving port, frames must be processed using store-and-forward functions to prevent the transmitting port from getting ahead of the receiving port and attempting to transmit parts of a frame that have not been received yet.

Therefore, there is a need for a network device having a combination of transmit and receive ports with varying speeds to be able to support a combination of cut-through and store-and-forward functions simultaneously. Frames that are received on ports at least as fast as those they will be transmitted on can use cut-through functions. For combination of receive and transmit ports where the opposite is true, the device must use store-and-forward functions to forward frames.

SUMMARY OF THE INVENTION

It is therefore one object of the present invention to provide an improved high speed switching device for use in computer networks.

It is another object of the present invention to provide an improved high speed switching device for use in both local area and wide area computer networks.

It is yet another object of the present invention to provide a method of processing frames to enable simultaneous cut-through and store-and-forward transmission in high speed network processing.

As the need for high performance network devices continues to increase, network product designers are supporting more complex functions at the hardware level. One of these functions is cut-through frame processing. In cut-through processing, a frame can be processed by the network device, and can also start being transmitted before the frame is completely received. The alternative is store-and-forward frame processing in which a frame must be completely received before any frame processing or transmission is attempted. The advantage of the cut-through function is that it reduces the latency of the frame flowing through the network device. This latency becomes an even more significant issue as frames increase in size due to the increasing amount of time needed to receive and transmit a frame. In current switch designs where layer 2 frame forwarding function is provided, cut-through support is a relatively trivial function to perform since typically all ports of such a device run at the same transmission speed. When supporting layer 3 frame forwarding (network routing), cut-through support is no longer as trivial since this type of device can support ports capable of a variety of transmission speeds. In this case, it is not always true that a network device would need to support only cut-through functions or only store-and-forward functions. There are cases where both must be supported by the same network device. In general, a device can support cut-through functions only if the receiving port of the device is at least as fast as the transmitting port. In cases where the transmitting port of the device is faster than the receiving port, frames must be processed using store-and-forward functions to prevent the transmitting port from getting ahead of the receiving port and attempting to transmit parts of a frame that have not yet been received. Therefore, a high speed network device having a combination of transmit and receive ports with varying speeds must be able to support a combination of cut-through and store-and-forward functions. This enables frames that are received on ports that are at least as fast as those on which they will be transmitted to use cut-through functions. Otherwise, the device must use store-and-forward frame processing. The high speed network device described herein provides the ability to support both cut-through and store-and-forward functions simultaneously.

Five data structures are provided for storing received frames, representing them internally in the network device, and then processing the frames for transmission. Frame buffers store all or part of a received frame. A Buffer Parameter Vector chains multiple frame buffers together. Master Frame Parameter Vectors and Frame Parameter Vectors manage the frame as it flows through the network device. A Frame Parameter Vector is created for each unique version of a frame. A Logical Port Vector stores configuration information about each transmit and receive port, in particular, media speed.

Cut-through/store-and-forward decision logic makes a determination if a frame can be transmitted by cut-through, or if it must be transmitted by store-and-forward. Multiple unique frames or copies of a frame that are to be transmitted by store-and-forward have their Frame Parameter Vectors chained together by pointers. The cut-through/store-and-forward decision logic steps through the chain of Frame Parameter Vectors and indicates that the frame associated with each such vector is ready to be transmitted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment, when read in conjunction with the accompanying drawings, wherein:

FIG. 4 illustrates the Buffer Parameter Vector (BPV) data structure in accordance with the present invention;

FIG. 5 illustrates the Frame Parameter Vector (FPV) data structure in accordance with the present invention;

FIG. 6 illustrates the Master Frame Parameter Vector (MFPV) data structure in accordance with the present invention;

DETAILED DESCRIPTION OF THE PREFERRED EMBODIMENT

In accordance with the invention, a high speed network device is provided for the simultaneous support of both cut-through and store-and-forward functions. The invention is preferably implemented in hardware in a high speed network switch, but can be implemented in other network devices as well. The invention is directed at how a received frame is represented internally, and how the frame is processed as it is being received and then transmitted over one or more output ports.

Figure 1:
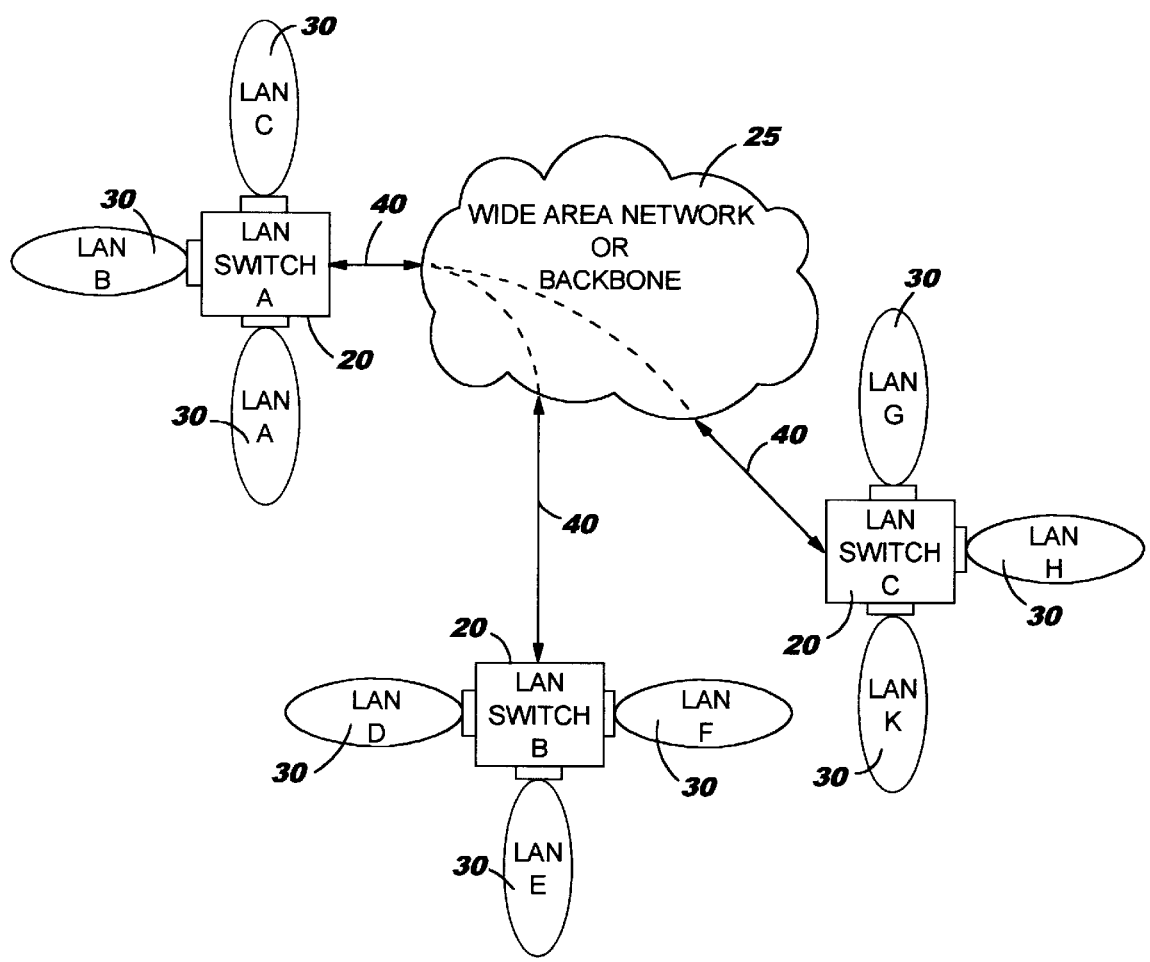
FIG. 1 illustrates a simplified network environment in which the present invention can be implemented.

FIG. 1 is an illustration of a simplified environment in which the invention can be implemented. FIG. 1 shows a plurality of LAN switches 20 that interconnect multiple LAN segments 30 with a high speed wide area network or backbone 25 such as ATM or Gigabit Ethernet. LAN segments 30, though depicted as rings in FIG. 1, can be Ethernet LANS, token ring LANs, other types of LANs, or combinations of various types. LAN segment A can connect to LAN segments B, C internal to LAN switch A. However, LAN segment A can also connect to wide area network or backbone 25 through link 40 and form a path across the wide area network or backbone 25 to connect to LAN switches B or C. Thus, LAN A can be connected to LANs D to K across the wide area network or backbone 25.

Figure 2:
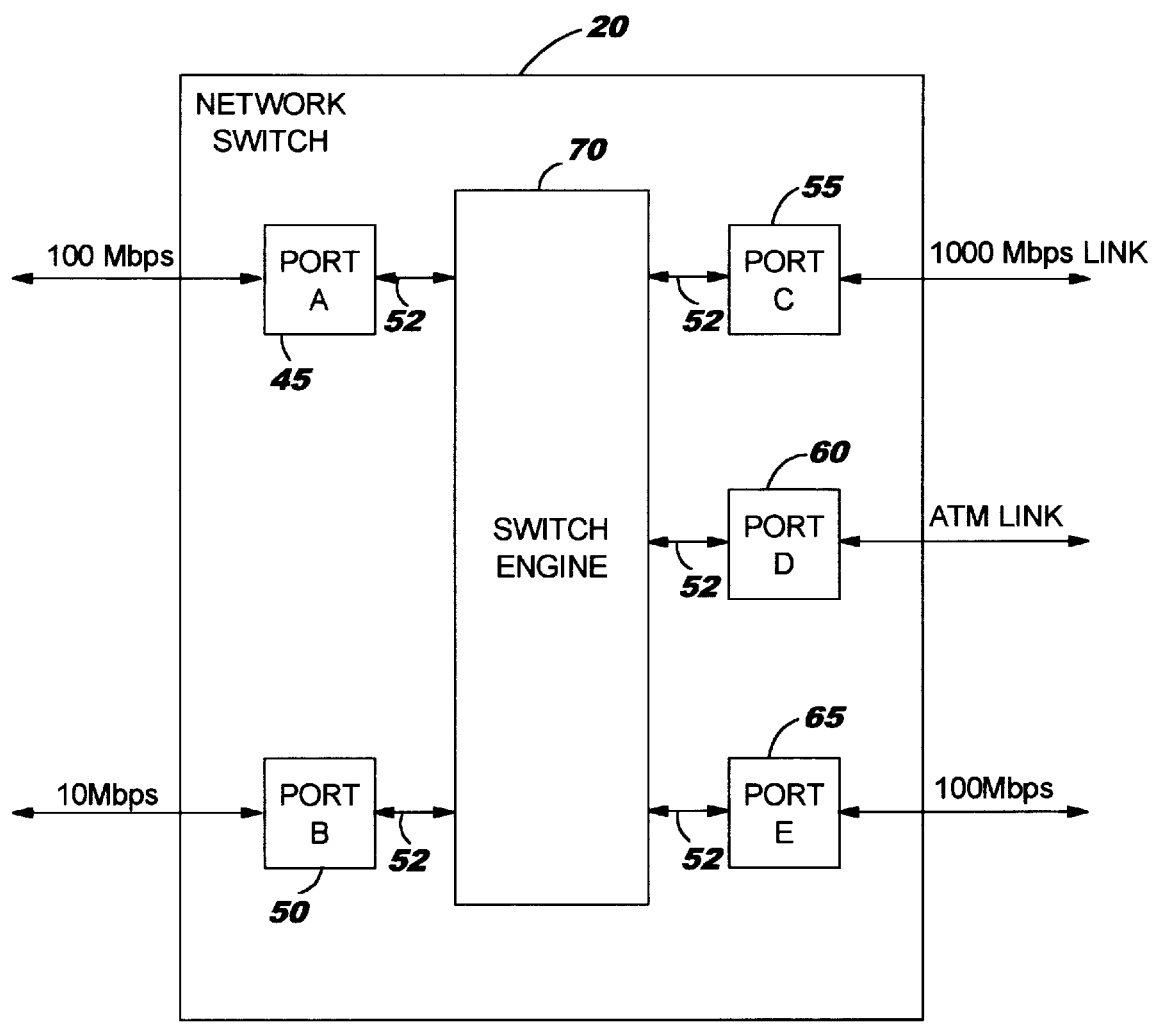
FIG. 2 illustrates a simplified network device in which the present invention can be implemented.

Referring now to FIG. 2, a simplified network device is shown in which the present invention can be embodied. As illustrated, network switch 20 has five ports 45, 50, 55, 60, 65 interconnected by a switching engine 70. Ports 55 and 60 are connected to Gigabit Ethernet and ATM links, respectively. Any of the ports can be switched to connect to any other port. Switching engine 70 is capable of supporting multiple connections simultaneously and is bidirectional. The interface to each port is switch interface 52 regardless of the port type or number of ports supported by switching engine 70.

Figure 3:
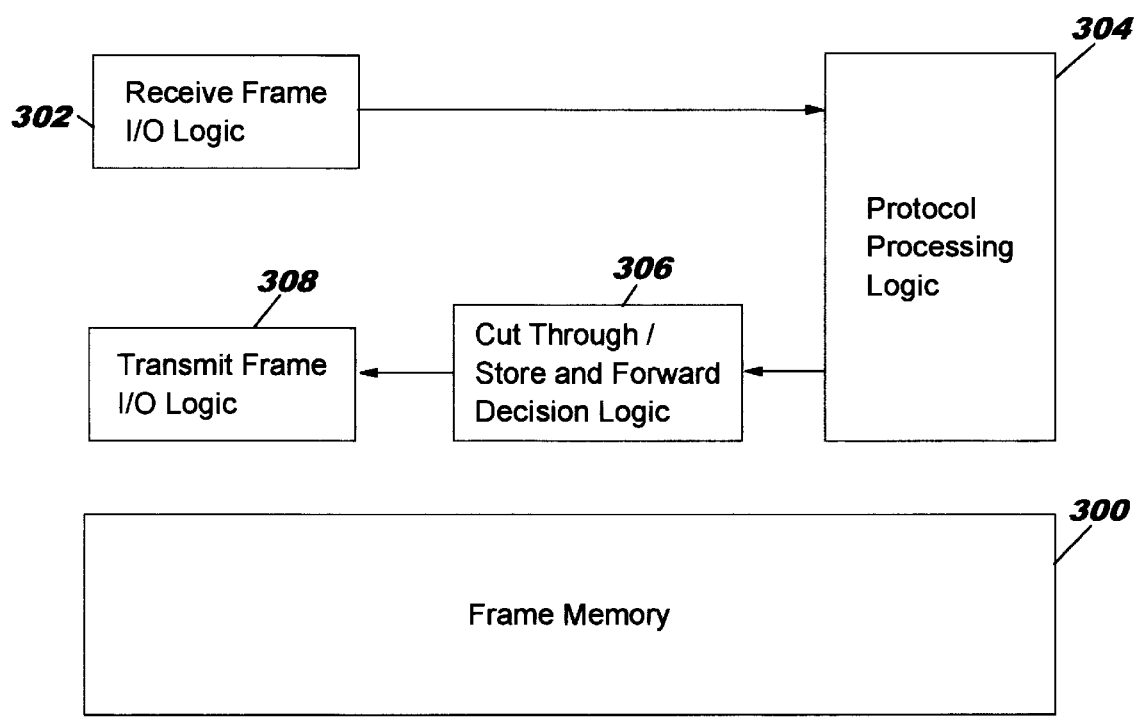
FIG. 3 illustrates a high level architecture of a device that supports simultaneous cut-through and store-and-forward processing of frames in hardware in accordance with an illustrative embodiment of the invention.

FIG. 3 illustrates the high level architecture of the device that is required to support cut through and store-and-forward processing simultaneously. Frame memory 300 is where frames are stored while being operated on by this device. The receive frame I/O logic 302 is responsible for receiving the frame from some external network port and storing the frame in frame memory 300. The protocol processing logic 304 is responsible for network processing of the frame. This can include network protocol processing, unicast and multicast frame support, determining which output port the frame is sent to, etc. When the protocol processing logic 304 processes a multicast frame, it can create any number of different versions of the original received frame. The method the protocol processing logic 304 uses to perform multicasting of frames is outside the scope of this invention and is fully described in the cross-referenced related application "Multicast Frame Support in Hardware Routing Assist" incorporated by reference herein. The cut-through/store-and-forward decision logic 306 is responsible for determining whether a frame can be forwarded by cut-through or by store-and-forward, and then indicating to the transmit frame I/O logic 308 when the frame can be transmitted. If a frame can be forwarded by cut-through, cut-through/store-and-forward logic 306 indicates to the transmit frame I/O logic 308 that a frame can be transmitted when the protocol processing logic 304 has completed processing the frame. If a frame must be forwarded by store-and-forward, cut-through/store-and-forward logic 306 must wait to indicate to the transmit frame I/O logic 308 that the frame can be transmitted until after the frame is completely received by the receive frame I/O logic 302. The transmit frame I/O logic 308 is responsible for actually transmitting the frames in frame memory 300 to the external network ports.

As stated previously, the problem of forwarding frames using either cut-through or store-and-forward functions is made up of two parts. The first part is how the frame is represented internally; the second part is how to actually perform the cut-through or store-and-forward functions. These two aspects of this invention are discussed below, in turn. First, the internal representation of frames is discussed; then the actual cut-through and store-and-forward processing is discussed.

With respect to how the present invention represents received frames internally to a network device, there are five data structures of interest: (1) Frame Buffer; (2) Buffer Parameter Vector; (3) Frame Parameter Vector; (4) Master Frame Parameter Vector; and (5) Logical Port Vector. These data structures, and how they function within the preferred embodiment, can be described as follows.

The first data structure discussed will be the Frame Buffer data structure. A Frame Buffer data structure is a data buffer location of a predetermined (e.g., 64 bytes) size that is used to store all or part of a received network frame. The size of these data buffers can be selected such that the buffers are large enough to contain a frame header and small enough to avoid wasting memory resources. The predetermined size of these data buffers is within the purview of the designer and will vary dependent upon the structure of the frames to be transmitted through a network device and the capabilities of the actual hardware, software or firmware in which the Frame Buffer data structures are implemented. These frame buffers can be chained together using Buffer Parameter Vectors (BPVs) in order to completely buffer any frame.

A Buffer Parameter Vector (BPV) data structure is a data structure used to chain multiple frame buffers together in order to create a virtual buffer large enough to store an entire frame (assuming that a Frame Buffer is of a size smaller than a frame to be stored). There is a one to one correspondence between BPVs and Frame Buffers. The BPV data structure is made up of the following fundamental fields: (1) a Next BPV field, which is a pointer to the next BPV in a chain of BPVs; and (2) an FB-PTR (Frame Buffer-Pointer) field, which is a pointer to the frame buffer that a given BPV is associated with. Those skilled in the art will note that since there is a one to one relationship between BPVs and Frame Buffers, the FB-PTR field is not necessarily needed for implementation purposes. As will be understood by those skilled in the art, one could use an index to address the BPVs, and the same index to address buffer pointers. The BPV data structure is illustrated in FIG. 4.

The next data structure of interest is the Frame Parameter Vector data structure as illustrated in FIG. 5. A Frame Parameter Vector (FPV) data structure is used along with a Master Frame Parameter Vector (MFPV) data structure (described below) to manage a frame as it flows through a specific network device. There is one FPV required for each unique version of a frame. Therefore, in the case of a unicast frame, only a single FPV is required, and in the case of multicast frames, multiple FPVs may be required. The primary purpose of the FPV is to provide access to the first Frame Buffer (which, in an illustrative embodiment of the present invention, is typically the header buffer) of a frame, and provide a means of managing multiple versions of the same frame. The FPV data structure is made up of the following fundamental fields: (1) a Parent Pointer field, which is a pointer to the parent data structure for this FPV (in an illustrative embodiment, this parent data structure can be either a MFPV or another FPV); (2) a First BPV data structure field, which is a pointer to the first BPV of the frame represented by this FPV (in an illustrative embodiment, the frame buffer pointed to by this first BPV contains the frame header); (3) a Next FPV data structure field, which is a pointer to another FPV and used to chain multiple FPVs together; and (4) a TX port field, which indicates the port on which the frame is to be transmitted. Other fields shown in FIG. 5 as well as in FIG. 6, and not described herein, are implementation dependent.

The next data structure of interest is the Master Frame Parameter Vector (MFPV) which is illustrated in FIG. 6. A Master Frame Parameter Vector (MFPV) data structure is used along with a Frame Parameter Vector (FPV) to manage a frame as it flows through a particular network device. There is one MFPV for each frame that is received by a particular network device. The purpose of the MFPV is to hold global information about a frame. Each MFPV has from 1 to n child FPVs that all point back to it. For an inbound frame, and a unicast outbound frame, there will only be a single FPV pointing back to the MFPV. For the multicast case, there can be any number of FPVs that all point back to this MFPV. For the purposes of an illustrative embodiment of the present invention, the MFPV exists strictly as a common data structure relating all versions of the same multicast frame to each other. The MFPV is made up of the following fundamental fields: (1) a RX Port field which indicates which port a frame was received on; (2) a Store-and-Forward Head Pointer field which points to the FPV at the front of a chain of the MFPV's associated FPVs when the frames must be forwarded using store-and-forward functions (these FPVs are stored in this chain until the frame is completely received); and (3) a Store-and-Forward Tail Pointer field which points to the FPV at the tail of a chain of this MFPV's associated FPVs when the frames must be forwarded using store-and-forward functions.

The last data structure of interest in the preferred embodiment is the Logical Port Vector data structure. A Logical Port Vector (LPV) data structure stores configuration information about each transmit and receive port. For the purposes of this embodiment the only field of interest is the Media Speed field. The Media Speed field indicates the speed of a port relative to other ports. If the Media Speed field for a receive port is greater than or equal to the Media Speed field for a transmit port, then the receive port is at least as fast as the transmit port. When this is the case, frames can be forwarded by cut-through. The media speed is known and initialized on a port-by-port basis in the LPV.

In the preferred embodiment of the invention, the cut-through and store-and-forward functions are performed in two phases. The first phase is performed when the frame is being received. When enough of the frame is received so that processing of the frame can begin, that part of the frame is passed to the protocol processing logic 304. The second phase is performed when the protocol processing logic 304 has completed processing a frame, or a version of a frame in the multicast case, and the destination transmit port is known. Here, the cut-through/store-and-forward decision logic 306 must determine if the frame can be forwarded directly to the transmit frame I/O logic 308 by cut-through, or if the frame must be stored in frame memory 300 until it is completely received before it is forwarded to the transmit frame I/O logic 308. These two phases of this invention are described as follows.

Figure 7:
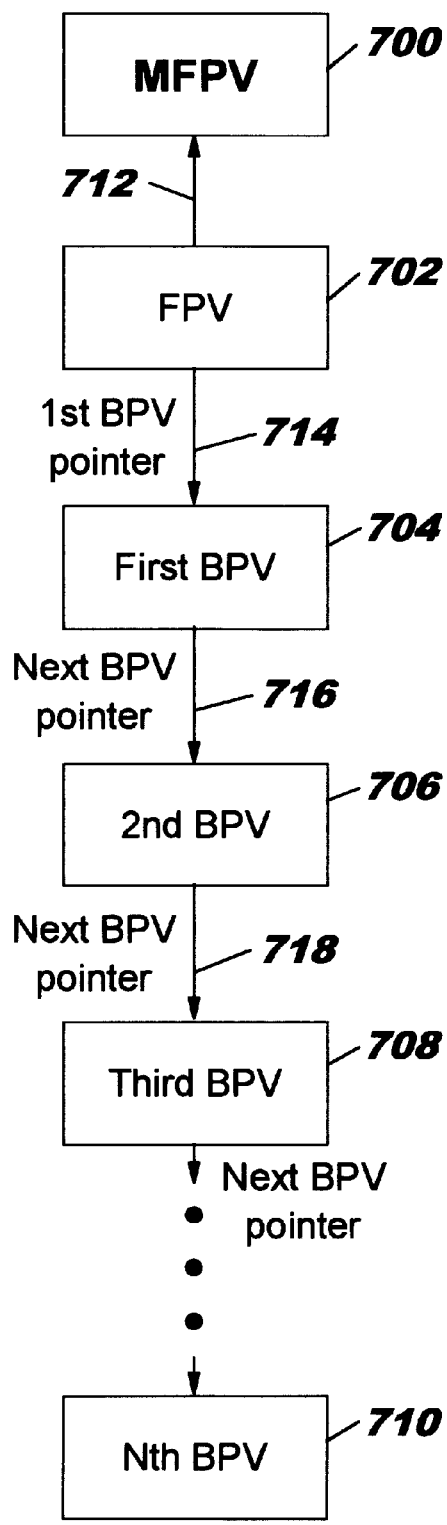
FIG. 7 illustrates how a received frame is represented in accordance with an illustrative embodiment of the invention.

The receive frame I/O logic 302 builds a frame as it is received by a network device implementing this invention. A received frame is built in frame memory 300 using the data structures described previously. FIG. 7 illustrates how a received frame is represented in the preferred embodiment of this invention. Here, when a frame is received, the receive frame I/O logic 302 builds an initial structure of an MFPV, an FPV, and a BPV.

FIG. 7 illustrates how an MFPV, an FPV, and one or more BPVs are utilized. As shown in the figure, MFPV 700 is created first, and is utilized to hold global information about a frame. If it has been determined that the frame is to be unicast, there is one FPV 702 associated with MFPV 700. FPV 702 has a parent pointer field, graphically illustrated as pointer 712, which points to MFPV 700 with which FPV 702 is associated; FPV 702 also has a first BPV data structure field, graphically illustrated as pointer 714, which points to first BPV 704. First BPV 704 has a next BPV field, graphically illustrated as pointer 716, which points to second BPV 706; first BPV 704 also has an FB-PTR (Frame Buffer-Pointer) field (not shown) which actually points to the location where the actual portion of a received frame, associated with first BPV 704, is stored (the FB-PTR field allows a BPV to be used to manipulate actual received frame contents).

Second BPV 706 has a next BPV field, graphically illustrated as pointer 718, which points to third BPV 708; BPV also has an FB-PTR (Frame Buffer-Pointer) field (not shown) which actually points to the location where the actual portion of a received frame, associated with second BPV 706, is stored (the FB-PTR field allows a BPV to be used to manipulate actual received frame contents).

As can be seen from FIG. 7, as more true buffer space is required by the inbound frame, the receive frame I/O logic 302 can create a larger virtual buffer by adding on more buffers using BPVs. This fact is illustrated by showing that the chain could extend, in the manner discussed previously, all the way to an Nth BPV 710.

When enough of the frame has been received that processing of the frame can begin, that part of the frame is passed to the protocol processing logic 304. In this embodiment, this part of the frame must fit in the first buffer. When the receive frame I/O logic 302 has received enough of a frame to fill the first buffer, it indicates to the protocol processing logic 304 that the frame is ready to be processed. This is done by passing the protocol processor logic 304 a pointer to the FPV of the frame. After the pointer to the FPV has been passed to the protocol processing logic 304, the receive frame I/O logic 302 will continue to keep a pointer to the MFPV and FPV in order to continue receiving the incoming frame by adding more buffers to the end of the chain of buffers.

When the protocol processing logic 304 has completed processing a frame, control of the frame is handed off to the cut-through/store-and-forward decision logic 306. After the protocol processing logic finishes processing the frame, the frame can take the form of a unicast frame or a multicast frame. If the frame is a unicast frame, its data structures will take the same form as they were when the frame was received as discussed above with respect to the description of FIG. 7. In the multicast case, a frame can take the form of multiple copies of the exact same frame, multiple copies of the frame in which the header of each is modified, or a combination of both of these cases. For the purposes of this invention, multicast frames are represented by the data structures described previously, as illustrated in FIG. 8. In this representation, each unique version of the same frame must have a "parent" FPV that specifies the characteristics of that version of the frame, and associates it with the MFPV of the original received frame. Each parent FPV has a new first buffer associated with it. Each new first buffer contains the unique part of the multicast frame. Parent FPVs 2 through m illustrate this concept in FIG. 8.

Figure 8:
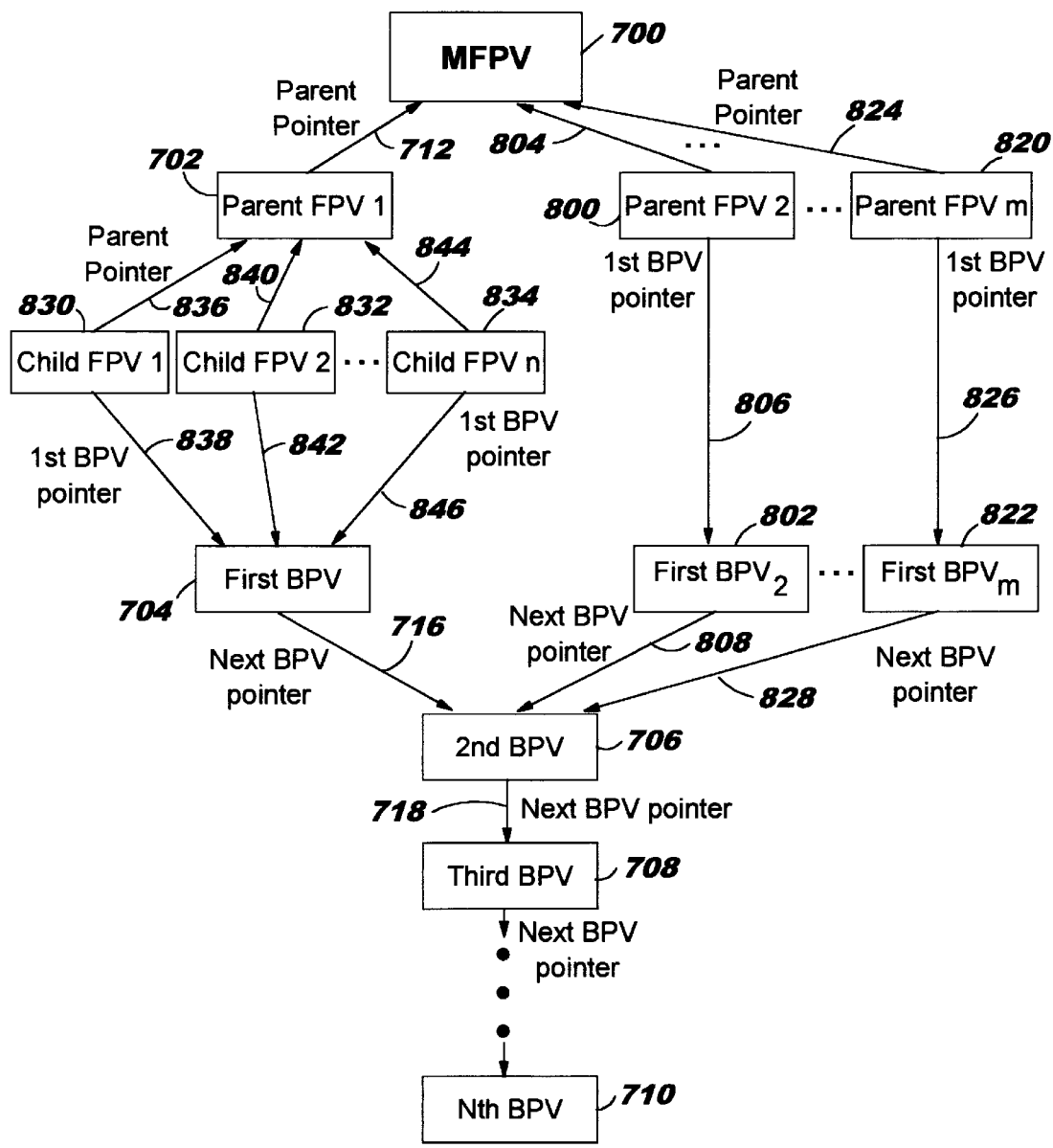
FIG. 8 illustrates how multicast frames are represented by the BPV, FPV and MFPV data structure in accordance with the present invention.

As can be seen in FIG. 8, MFPV 700, FPV 702, BPVs 704–710, and graphical representation of pointers 712–718 have been reproduced from FIG. 7. The foregoing cited elements function in FIG. 8 as was described in relation to FIG. 7. In addition to the foregoing, since it has been determined that the frame is to be multicast, and that the headers of one or more the frames to be multicast are to be somewhat different than that of the frame received, there is a need for one or more unique frames. Accordingly, shown in FIG. 8 is that m FPVs have been created, where each FPV will be used to generate unique frames.

As shown in FIG. 8 there is a second FPV 800 (FPV 2) associated with MFPV 700. The second FPV 800 has a parent pointer field, graphically illustrated as pointer 804, which points to MFPV 700 with which the second FPV 800 is associated; the second FPV 800 also has a first $BPV_2$ data structure field, graphically illustrated as pointer 806, which points to first $BPV_2$ 802. First $BPV_2$ 802 has a next BPV field, graphically illustrated as pointer 808, which points to second BPV 706; first $BPV_2$ 802 also has an FB-PTR (Frame Buffer-Pointer) field (not shown) which points to the location where the actual portion (in this instance, that portion being the header) of a received frame, associated with first $BPV_2$ 802, is stored (the FB-PTR field allows a BPV to be used to manipulate actual received frame contents). Since it has been determined that the header of the received data frame associated with first $BPV_2$ 802, is to be modified, the FP-PTR field of first $BPV_2$ 802 can be utilized to manipulate the header independent of the rest of the frame.

Further shown in FIG. 8 is the $m^{th}$ FPV 820 associated with MFPV 700. The $m^{th}$ FPV 820 has a parent pointer field, graphically illustrated as pointer 824, which points to MFPV 700 with which the $m^{th}$ FPV 820 is associated; the $m^{th}$ FPV 820 also has a first $BPV_m$ data structure field, graphically illustrated as pointer 826, which points to first $BPV_m$ 822. First $BPV_m$ 822 has a next BPV field, graphically illustrated as pointer 828, which points to second BPV 706; first $BPV_m$ 822 also has an FB-PTR (Frame Buffer-Pointer) field (not shown) which actually points to the location where the actual portion (in this instance, that portion being the header) of a received frame associated with first $BPV_m$ 822, is stored (the FB-PTR field allows a BPV to be used to manipulate actual received frame contents). Since it has been determined that the header of the received data frame, associated with first $BPV_m$ 822, is to be modified, the FP-PTR field of first $BPV_m$ 822 can be utilized to manipulate the header independent of the rest of the frame.

For the case when multiple copies of the same version of a frame are required, "child" FPVs are created for each copy that is required. These child FPVs characterize each copy of the frame and associate it with the unique parent FPV for that version of the frame. The child FPVs all point to the same first buffer for the version of the frame being replicated. This insures that the exact same version of the frame is used for each copy of the frame. Parent FPV 1 and child FPVs 1 through n illustrate this concept in FIG. 8. It is the responsibility of the protocol processing logic to set up the pointers between the various data structures and to fill each first buffer with the unique version of the frame required. The details of this process is described in the cross-referenced patent application, "Multicast Frame Support in Hardware Routing Assist" incorporated by reference herein.

Each unique received data frame is represented by a unique MFPV-Parent FPV pair; therefore, as shown in FIG. 8, MFPV 700 is paired with parent FPV 702. Parent FPV 702 has parent pointer field, graphically illustrated as pointer 712, which points to MFPV 700 with which FPV 702 is associated. Likewise, the pairings of MFPV 700 with parent FPV 800 and with parent FPV 820 each represent unique data frames. As further illustrated in FIG. 8, exact replicas of the unique received data frame represented by the pairing of MFPV 700 and FPV 702 are to be created. These are shown as n child FPVs 830, 832, and 834. Each of the n child FPVs 830, 832, and 834, has a parent pointer field, graphically illustrated as pointers 836, 840, and 844 respectively, which point to Parent FPV 702 with which each of the n child FPVs 830, 832, and 834 is associated; each of the n child FPVs 830, 832, and 834 also has a first BPV data structure field, graphically illustrated as pointers 838, 842, and 846, which points to first BPV 704. First BPV 704 has a next BPV field, graphically illustrated as pointer 716, which points to second BPV 706; first BPV 704 also has an FB-PTR (Frame Buffer-Pointer) field (not shown) which actually points to the location where the actual portion of a received frame, associated with first BPV 704, is stored (the FB-PTR field allows a BPV to be used to manipulate actual received frame contents). It should be noted that this method and system require virtually no additional storage other than that originally (excepting the storage necessary for the FPVs) necessary for the unicast frame. After the illustrated child FPVs have been created, the transmit frame I/O logic 308 can be instructed to transmit the frames to the appropriate ports.

As the protocol processing logic 304 completes the processing of the frame, or each copy of the frame in the multicast case, it informs the cut-through/store-and-forward decision processor 306 of this by passing it the FPV of the frame that is ready to transmit. For the multicast case, the FPV that is passed is the child FPV in the case where several copies of the same frame are created, and the parent FPV in the case where a single unique copy of a frame is required. The cut-through/store-and-forward decision logic 306 uses this FPV and the MFPV the frame is associated with to determine whether to forward the frame as cut-through, or store-and-forward. If it is determined that the receive frame I/O logic 302 has completely received the frame (i.e., the MFPV is no longer being processed by the receive frame I/O logic), the frame can be transmitted immediately, and the transmit frame I/O logic 308 will be instructed to do this. If the frame is still being received, it must be determined if the receive port is at least as fast as the transmit port. This is done by comparing the media speed fields of the LPV for the transmit port indicated in the FPV and the receive port indicated in the MFPV. If this field value for the receive port is at least as large as this field value for the transmit port (i.e., indicating that the receive port speed is equal to or faster than the transmit port speed), then the frame can be transmitted immediately, and the transmit frame I/O logic 308 will be instructed to do this. If the value in the media speed field for the transmit port is larger than the value in the media speed field for the receive port, then the frame must be forwarded by using store-and-forward.

Figure 9:
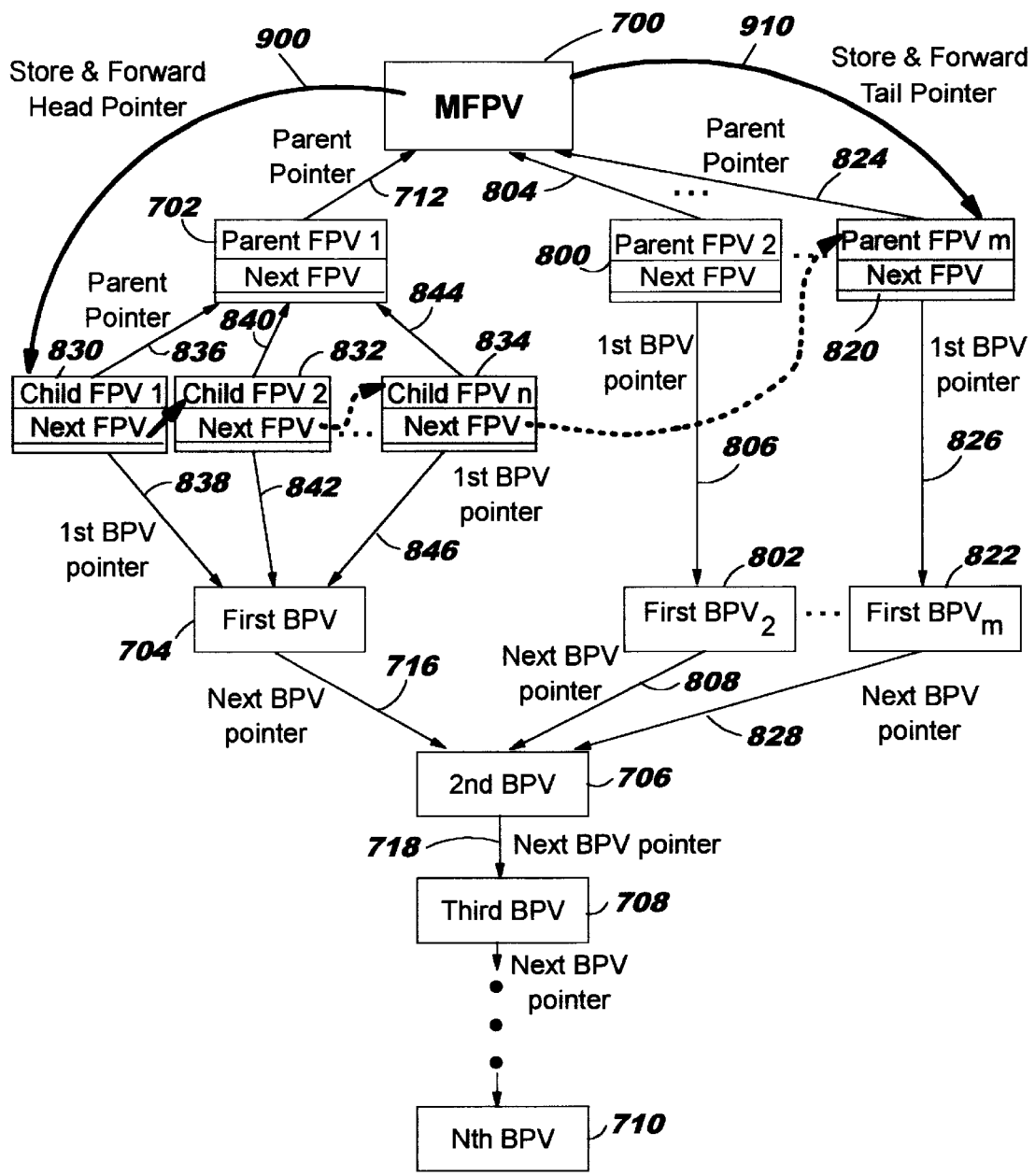
FIG. 9 illustrates the store-and-forward processing of frames which are represented by the BPV, FPV and MFPV data structures in accordance with the present invention.

In order to forward a frame by store-and-forward, the frame must be temporarily stored until the frame has been completely received. This is done by creating a chain of FPVs using the store-and-forward head and tail pointers located in the MFPV associated with the frame. For each copy of the frame that must be forwarded by the store-and-forward method, its FPV is added to the store-and-forward chain of the MFPV. This concept is illustrated in FIG. 9. Here, all copies of the frame except the frame associated with the second parent FPV 800 have been determined as needing to be forwarded by store-and-forward, and their FPVs have been chained together using the store-and-forward head pointer 900, next FPV pointers 902, 904, 906, and store-and-forward tail pointer 910. When the frame has been completely received by the receive frame I/O logic 302, the receive frame I/O logic 302 will indicate this to the cut-through/store-and-forward decision logic 306 by passing it a pointer to the MFPV 700. At this time, all frames associated with the MFPV 700, that were designated as store-and-forward frames, can be transmitted. The cut through/store-and-forward logic 306 uses the MFPV's store-and-forward head, next, and tail pointers 900, 902, 904, 906, 910 to step through the chain of FPVs and indicate to the transmit frame I/O logic 308 that the frame associated with each FPV is ready to be transmitted. At this time, the transmit frame I/O logic 308 will transmit each of the store-and-forward frames.

Figure 10:
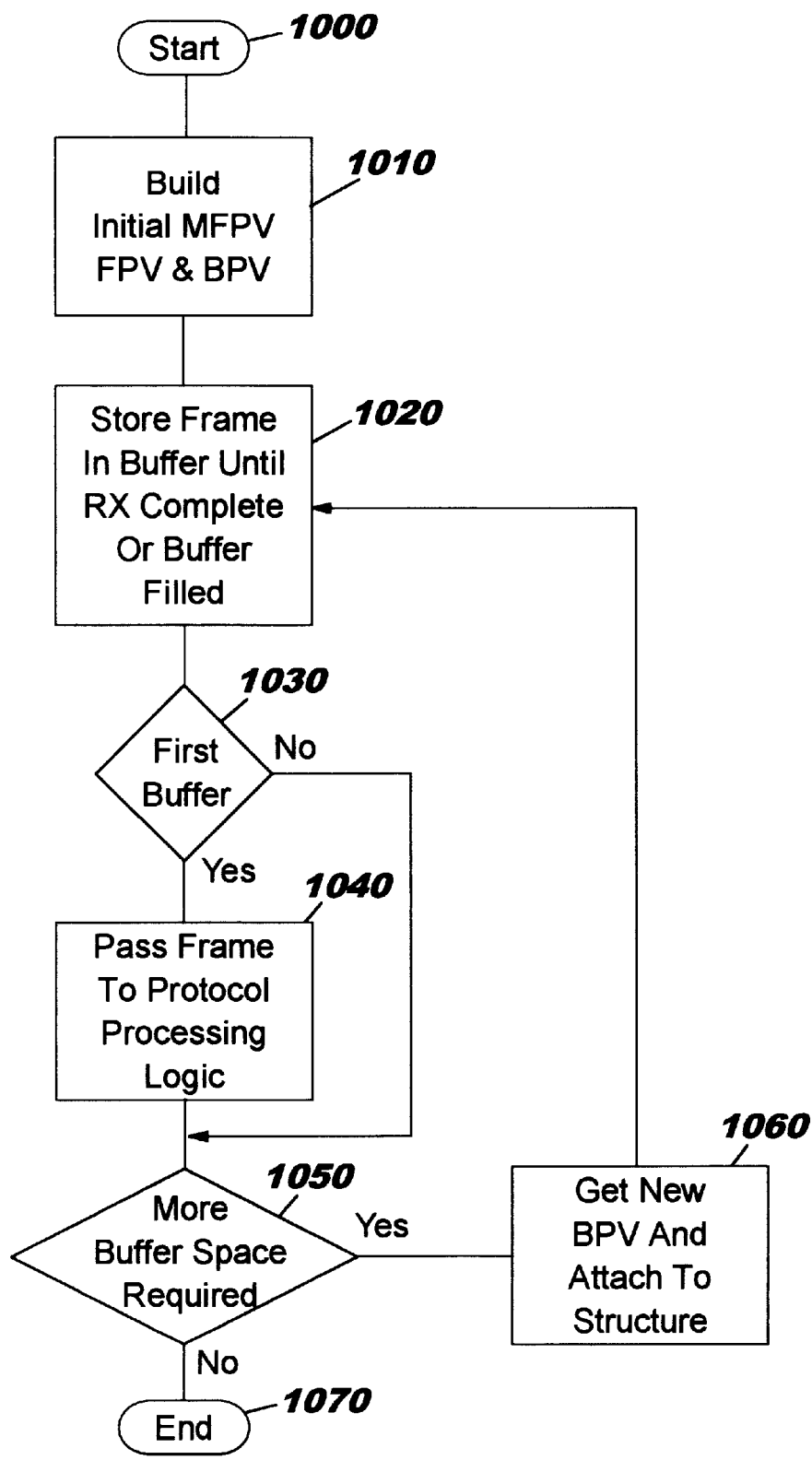
FIG. 10 illustrates a high level flow chart depicting the receive flow process whereby a frame is built in accordance with an illustrative embodiment of the invention.
Figure 11:
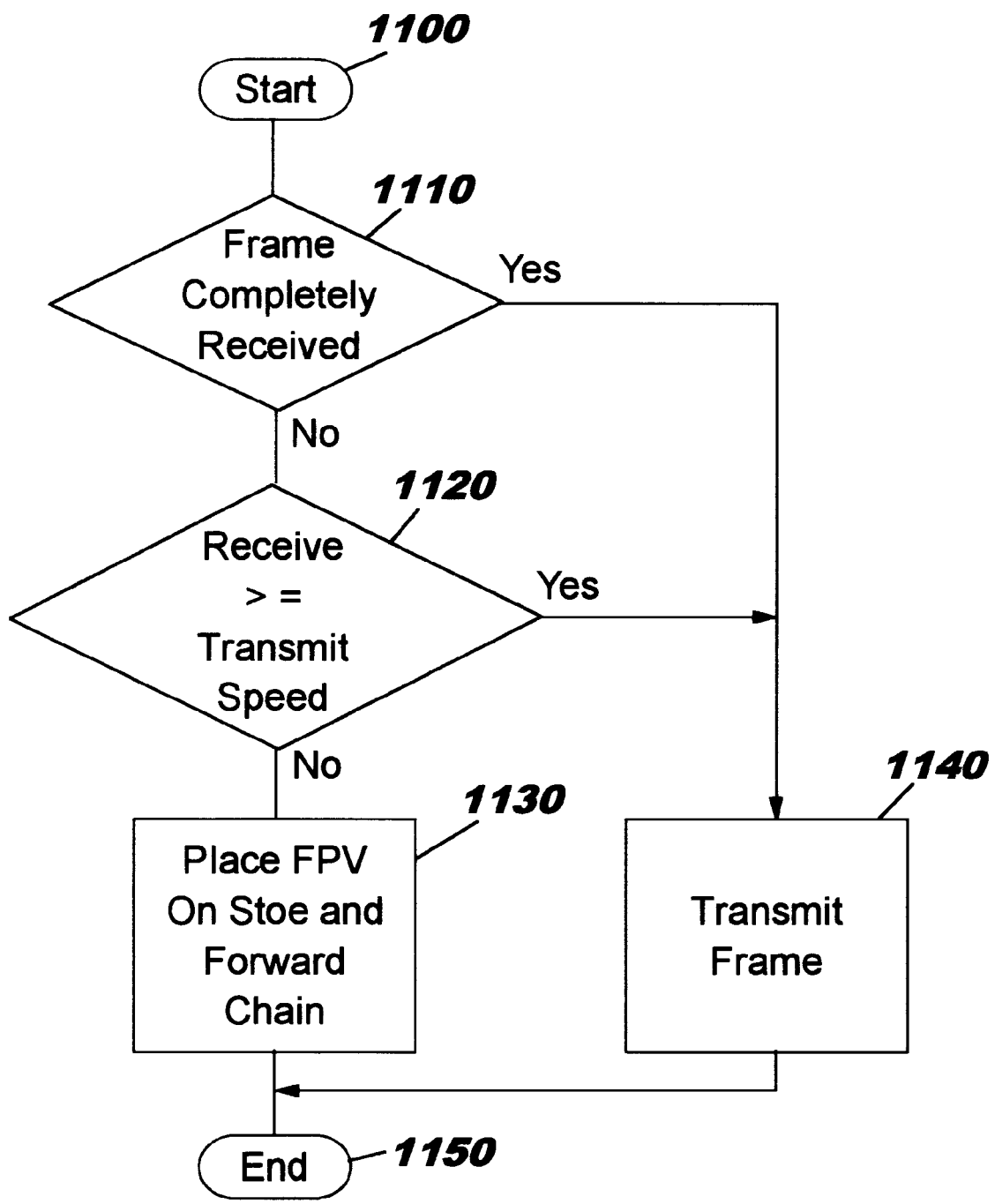
FIG. 11 illustrates a high level flow chart depicting the cut-through/store-and-forward decision process whereby a frame is either transmitted by cut-through or placed on a store-and-forward chain in accordance with the present invention.
Figure 12:
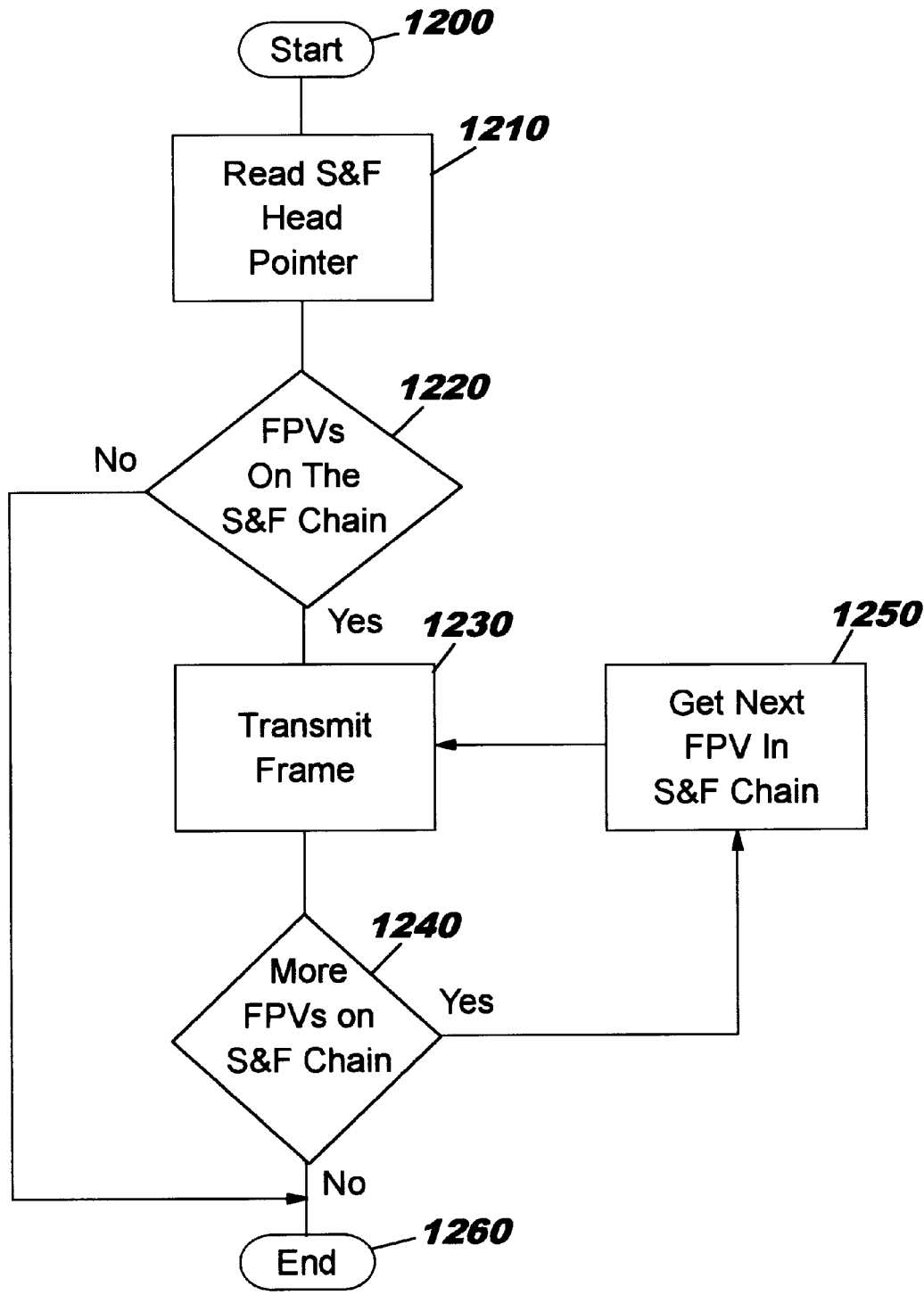
FIG. 12 illustrates a high level flow chart depicting the processing of frames placed on a store-and-forward chain in accordance with the present invention.

The summary flow charts in FIGS. 10–12 illustrate how the individual parts of this invention fit together to provide a complete solution. FIG. 10 shows the flow for a frame being built in the system. FIG. 11 shows the process that is followed by the cut-through/store-and-forward decision logic 306 after the protocol processing logic 304 completes processing each version of the frame. FIG. 12 shows the process that is followed by the cut-through/store-and-forward decision logic 306 after a frame has been completely received and is to be transmitted (store-and-forward processing).

Referring now to FIG. 10, there is shown a high level logic flowchart showing the receive flow process whereby a frame is built in accordance with an illustrative embodiment of the present invention. Logic step 1000 depicts the start of the process. Logic step 1010 illustrates the building of an initial MFPV, FPV, and BPV for a received frame by computational equipment associated with the network device in which the present illustrative embodiment is incorporated.

Thereafter, logic step 1020 shows the storing of the received frame in a buffer (storage location); the amount of the received frame that can be stored will be dependent upon the size of the buffer, and if the frame is larger than the storage location, the portion of the frame that will fit is stored in the buffer. When the first frame buffer has been completely filled, or the frame has been completely received as shown by decision step 1030, the frame is passed to protocol processing logic 304 as indicated by logic step 1040. In order to continue receiving the incoming frame, the process then proceeds to decision step 1050.

Thereafter, decision step 1050 depicts a determination of whether more buffer space is required; that is, whether all of the received frame has been stored or whether a portion remains that has yet to be stored.

In the event that more buffer space is required, then the process proceeds to logic step 1060 which depicts the creation of a new BPV, which is attached to the existing BPV chain. (The BPV is utilized to chain together the portions of the received frame, as was discussed above). Thereafter, the process proceeds to logic step 1020 wherein the portion is stored.

The 1020-1030-1040-1050-1060 loop continues until the received data structure has been completely stored. Once the data structure has been completely stored, then the inquiry depicted in logic step 1050 yields the result that no more buffer space is required. Consequently, the process proceeds to logic step 1070 and ends.

Shown in FIG. 11 is the process that is executed by cut-through/store-and-forward decision processor 306 when the protocol processing logic 304 completes processing each version of the received frame. Logic step 1100 depicts the commencement of the process. In decision step 1110, a test is made as to whether or not the frame has been completely received. If it has, then the frame is transmitted as indicated in logic step 1140 by transmit frame I/O logic 308. If the frame has not been completely received, the cut-through/store-and-forward decision processor 306 performs decision step 1120 in which a test is made to determine if the port on which the frame is received is at least as fast as the port on which the frame is to be transmitted. If the receive port speed is greater than or equal to the transmit port speed, the process proceeds to logic step 1140 and transmit frame I/O logic 308 transmits the frame by cut-through. Otherwise, the frame must be transmitted by store-and-forward and the process ends in logic step 1150. Although not shown in FIG. 11, there are several other tests performed in addition to that performed in decision step 1120 to determine if the frame must be transmitted by store-and-forward or can be transmitted by cut-through. These tests include: (1) whether the output port requires (i.e., is configured for) store-and-forward transmission; (2) whether the output port needs the entire frame length at the beginning of the frame; and (3) whether input errors are high and would result in forwarding of excessive numbers of error frames. Other conditions may be applicable to the cut-through or store-and-forward decision and be tested for as well.

FIG. 12 depicts the process followed by cut-through/store-and-forward processor 306 when the frame is completely received and is to be transmitted by store-and-forward techniques. This corresponds to the situation in FIG. 9 in which n copies of a unique frame and m unique frames are to be multicast. Logic step 1200 depicts the start of the process. In logic step 1210, the store-and-forward head pointer is read. The process then proceeds to decision step 1220 where a test is made to determine if there are any FPVs on the store-and-forward chain. If there are, then the cut-through/store-and-forward processing logic 306 steps through the chain of FPVs and indicates to the transmit frame I/O logic 308 that the frame is ready to be transmitted. This is depicted by logic step 1230. Next, decision step 1240 determines if there are additional FPVs on the store-and-forward chain. If there are, processing continues in logic step 1250 where the next FPV in the store-and-forward chain is identified and returns to logic step 1230 to have the frame transmitted. The loop depicted by steps 1240-1250-1230 continues until the end of the store-and-forward chain is reached. The process then ends in logic block 1260.

As an example of the use of the present invention in the context of the simplified network switch diagram of FIG. 2, consider a 100 Mbps frame arriving at port 45. The frame is to be multicast from ports 50, 55, 60 and 65. An unmodified version of the frame goes to ports 50 and 55. A second version of the same frame goes to port 60 (ATM link) and a third version goes to port 65.

As described previously, one Master Frame Parameter Vector is generated for the received frame. Multiple Frame Parameter Vectors are generated for each copy of the frame and for each unique version of the frame. Thus, two Frame Parameter Vectors (FPV 1, FPV 2) are generated for the unmodified versions of the frame. Appropriate Buffer Parameter Vectors are also generated as the frame is being received. FPV 1 is enqueued to 10 Mbps port 50 for cut-through since the input port speed exceeds the output port speed. However, FPV 2 is placed on the store-and-forward queue until the entire frame arrives since its output port 55 is faster than the associated input port 45.

A second unique version of the received frame at port 45 goes to port 60 for transmission to an ATM network. FPV 3 is generated and placed on the store-and-forward queue until the entire frame arrives. This is the case if the network interface device needs the entire frame length at the beginning of the frame.

A third unique version of the received frame at port 45 goes to port 65 for transmission. FPV 4 is generated and gets enqueued to 100 Mbps port 65 for cut-through since the input speed of port 45 is the same as the output speed of port 65.

Both FPV 2 and FPV 3 are placed on the store-and-forward queue. Once the entire frame arrives, FPV 2 and FVP 3 are placed on appropriate output queues for transmission.

Figure 13:
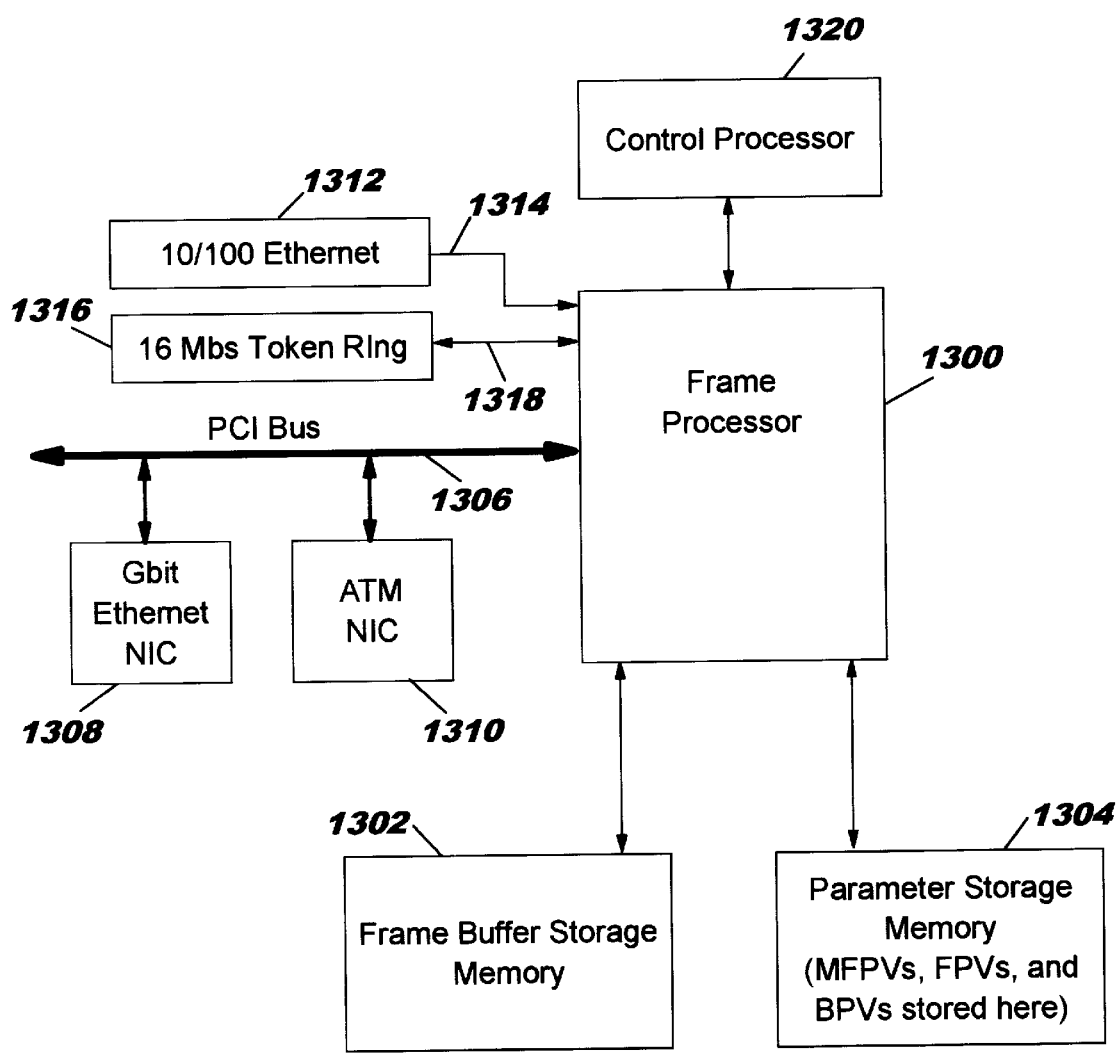
FIG. 13 illustrates a high level block diagram of a network device for implementing an illustrative embodiment of the present invention.

FIG. 13 is a high level block diagram of a network device for implementing an illustrative embodiment of the present invention. Depicted in FIG. 13 is hardware frame processor 1300, which can be implemented in an Application Specific Integrated Circuit (ASIC) by utilizing hardware description language (HDL) in a manner well known to those skilled in the art; also shown is frame buffer storage memory 1302 and parameter storage memory 1304 which can be implemented with any of a number of storage devices (such as DRAM) as is well known in the art. With respect to the FIG. 3 architecture frame buffer storage memory 1302 and parameter storage memory 1304 collectively make up what was represented as frame memory 300 in FIG. 3. The remaining aspects of the architecture of FIG. 3 are encompassed within hardware frame processor 1300 in FIG. 13. All functionality and activities of the data structures as depicted in FIGS. 4–9 and the flowcharts as depicted in FIGS. 10–12 are implemented in frame processor 1300 by state machines acting in conjunction with frame buffer storage memory 1302 and parameter storage memory 1304.

Connected to frame processor 1300 is PCI (peripheral component interconnect) bus 1306 which has slots to accept Gigabit Ethernet network interface card 1308 and ATM (asynchronous transfer mode) network interface card 1310. Also shown in FIG. 13 is a 10/100 Mbps Ethernet 1312 which connects to frame processor 1300 via bus 1314 and 16 Mbps token ring 1316 which connects to frame processor 1300 via bus 1318. Also shown is that control processor 1320 (which could be implemented via use of any number of processors, such as a microprocessor) is connected to and controls the operation of frame processor 1300.

As can be seen from FIG. 13, frame processor 1300 under the control of control processor 1320, receives different types of data frames. For example, frame processor 1300 receives Gigabit Ethernet protocol data frames from Gigabit Ethernet network interface card 1308 via PCI bus 1306. Frame processor 1300 also receives ATM protocol frames from ATM network interface card 1310 via PCI bus 1306. In addition, frame processor 1300 receives 10/100 Mbps Ethernet protocol data frames and 16 Mbps token ring protocol data frames via buses 1314 and 1318, respectively. Consequently, to do simultaneous cut-through/store-and-forward effectively, frame processor 1300 must be able to quickly and effectively determine if each unique frame can be transmitted by cut-through or if it must be transmitted by store-and-forward. Such determination can be made by the frame processor 1300, acting under the control of control processor 1320, because frame processor 1300 can be implemented as an ASIC designed to provide the method and system set forth in the previous data structures and flowcharts to ensure that cut-through/store-and-forward processing is achieved in an efficient manner.

While the invention has been particularly shown and described with reference to a preferred embodiment, it will be understood by those skilled in the art that various changes in form and detail may be made therein without departing from the spirit and scope of the invention. Specifically, while a hardware implementation has been described, it will be understood that the invention can be implemented in software, firmware, or any combination of hardware, software, or firmware. Furthermore, it will also be understood by those within the art that such implementations could be embodied within program products, which include but are not limited to programs fixed in some signal bearing media such as transmission media (e.g., web pages, bulletin boards, telnet sites, etc.) or recordable media (e.g., magnetic floppy disk, digital tape, CD ROM, etc.).

Having thus described our invention, what we claim and desire to secure as Letters Patent is as follows:

1. A computer network device having a plurality of ports operating at different transmission rates for receiving data frames and transmitting data frames by both cut-through and store-and-forward operations simultaneously, said network device comprising:

a receiver which receives a data frame at an input port;

a plurality of buffers which temporarily store portions of said data frame as it is being received;

a protocol processor which
  determines each output port to which said data frame is to be sent for transmission and
  modifies the header of said data frame if said data frame is to be sent to at least one output port supporting a different lower level protocol than the protocol supported by said input port;

a cut-through/store-and-forward decision processor which determines for each received frame whether said each output port can operate cut-through or must operate store-and-forward; and a transmitter which transmits said data frame
as it is being received by each said output port that can operate cut-through, and
after it is completely received by each said output port that must operate store-and-forward.

2. The network device of claim 1 further comprising:

means for providing a plurality of data structures, cooperative with said protocol processor, to internally represent said data frame within said network device and to facilitate the replication of data frames representative of said received data frame to be sent to each said output port; and means for chaining together a first data structure of said plurality of data structures that corresponds to each replicated data frame that is to be sent to each said output port that must operate store-and-forward.

3. The network device of claim 2 wherein said received data frame is replicated without modification and sent to multiple output ports.

4. The network device of claim 2 wherein said received data frame is replicated with a modified header and sent to multiple output ports.

5. The network device of claim 2 wherein said plurality of data structures include a buffer parameter vector data structure to chain together said plurality of buffers for temporarily storing portions of said data frame as it is received, each buffer parameter vector being associated with an individual buffer of said plurality of buffers.

6. The network device of claim 5 wherein said plurality of data structures includes a frame parameter vector data structure that is representative of each unique version of a data frame and that is used to provide access to a first of said plurality of buffers.

7. The network device of claim 6 wherein said plurality of data structures includes a master frame parameter vector data structure for managing said received data frame as it flows through said network device from said input port to each said output port.

8. The network device of claim 7 wherein said plurality of data structures includes a logical port vector data structure for storing configuration information about each port in said network device, said configuration information including media speed for each port.

9. The network device of claim 5 wherein each said buffer parameter vector includes a pointer to a next buffer parameter vector in a chain of buffer parameter vectors associated with said plurality of buffers, and a frame buffer pointer that points to said individual buffer associated with said each buffer parameter vector.

10. The network device of claim 6 wherein each said frame parameter vector includes a first pointer to a parent frame parameter vector, a second pointer to a first buffer parameter vector associated with said each frame parameter vector, a third pointer to a next frame parameter vector in a chain of frame parameter vectors corresponding to said each replicated data frame to be sent to each output port by store-and-forward, and a transmit port field indicating the output port from which the corresponding replicated frame is to be transmitted.

11. The network device of claim 7 wherein said master frame parameter vector includes a a receive field indicating the input port on which said data frame was received, a store-and-forward head pointer which points to a first frame parameter vector in said chain of frame parameter vectors, and a store-and-forward tail pointer which points to a last frame parameter vector in said chain of frame parameter vectors.

12. The network device of claim 10 wherein said parent frame parameter vector is a master frame parameter vector.

13. A method which transmits data frames by both cut-through and store-and-forward operations simultaneously in a computer network device having a plurality of ports operating at different transmission rates for receiving and transmitting data frames, said method comprising the steps of:

receiving a data frame at an input port;

temporarily storing portions of said data frames in a plurality of buffers as it is being received;

determining each output port to which said data frame is to be sent for transmission;

modifying the header of said data frame if said data frame is to be sent to at least one output port supporting a different lower level protocol than the protocol supported by said input port;

determining for each received frame whether said each output port can operate cut-through or must operate store-and-forward; and transmitting said data frame as it is being received by each said output port that can operate cut-through, and after it is completely received by each said output port that must operate store-and-forward.

14. The method of claim 13 further comprising:

providing a plurality of data structures to internally represent said data frame within said network device and to facilitate the replication of data frames representative of said received data frame to be sent to each said output port; and chaining together a first data structure of said plurality of data structures that corresponds to each replicated data frame that is to be sent to each said output port that must operate store-and-forward.

15. The method of claim 14 further comprising replicating said received data frame without modification and sending said replicated data frames to multiple output ports.

16. The method of claim 14 further comprising replicating said received data frame with a modified header and sending said replicated data frames to multiple output ports.

17. The method of claim 14 wherein said providing step includes generating a buffer parameter vector data structure to chain together said plurality of buffers for temporarily storing portions of said data frame as it is received, wherein each buffer parameter vector is associated with an individual buffer of said plurality of buffers.

18. The method of claim 17 wherein said providing step includes generating a frame parameter vector data structure that is representative of each unique version of a data frame and that is used to provide access to a first of said plurality of buffers.

19. The method of claim 18 wherein said providing step includes generating a master frame parameter vector data structure for managing said received data frame as it flows through said network device from said input port to each said output port.

20. The method of claim 18 wherein said providing step includes generating a logical port vector data structure for storing configuration information about each port in said network device, said configuration information including media speed for each port.

21. The method of claim 18 wherein each said generated buffer parameter vector includes a pointer to a next buffer parameter vector in a chain of buffer parameter vectors associated with said plurality of buffers, and a frame buffer pointer that points to said individual buffer associated with said each buffer parameter vector.

22. The method of claim 18 wherein each said generated frame parameter vector includes a first pointer to a parent frame parameter vector, a second pointer to a first buffer parameter vector associated with said each frame parameter vector, a third pointer to a next frame parameter vector in a chain of frame parameter vectors corresponding to said each replicated data frame to be sent to each output port by store-and-forward, and a transmit port field indicating the output port from which the corresponding replicated frame is to be transmitted.

23. The method of claim 19 wherein said generated master frame parameter vector includes a receive field indicating the input port on which said data frame was received, a store-and-forward head pointer which points to a first frame parameter vector in said chain of frame parameter vectors, and a store-and-forward tail pointer which points to a last frame parameter vector in said chain of frame parameter vectors.

24. The method of claim 22 wherein said parent frame parameter vector is a master frame parameter vector.

25. The method of claim 23 further comprising:

walking through said chain of frame parameter vectors corresponding to each replicated frame that is to be sent to an associated output port by store-and-forward, said walking step beginning with said first parameter vector pointed to by said store-and-forward head pointer, and ending with said last frame parameter vector pointed to by said store-and-forward tail pointer.

\* \* \* \* \*